United States Patent [19]
Rogers

[11] Patent Number: 6,116,093
[45] Date of Patent: Sep. 12, 2000

[54] DIFFERENTIAL PRESSURE GAUGE ASSEMBLY

[76] Inventor: John W. Rogers, 943 Wax Myrtle, Houston, Tex. 77079

[21] Appl. No.: 08/987,320

[22] Filed: Dec. 9, 1997

[51] Int. Cl.[7] .................................................. G01L 13/02
[52] U.S. Cl. ............................................................ 73/736
[58] Field of Search .............................. 73/736, 741, 732, 73/737, 862.193

[56] References Cited

U.S. PATENT DOCUMENTS

| | | | |
|---|---|---|---|
| 2,071,191 | 2/1937 | Wotring | 73/736 |
| 3,762,224 | 10/1973 | Vander Horst | 73/736 |
| 4,016,760 | 4/1977 | Taylor | 73/736 |
| 4,374,475 | 2/1983 | Hestich | 73/736 |
| 4,502,336 | 3/1985 | Dudash et al. | 73/736 |
| 5,433,119 | 7/1995 | Rogers | 73/862.193 |

*Primary Examiner*—Harshad Patel
*Assistant Examiner*—Abdullahi Aw-Musse
*Attorney, Agent, or Firm*—Browning Bushman

[57] ABSTRACT

A differential fluid pressure assembly (10) has an inner differential fluid pressure gauge (14) enclosed by an outer fluid-tight housing (12). A low pressure fluid inlet (34) is in fluid communication with the space (32) defined by the outer housing (12). A high pressure fluid inlet (38) extends through the outer housing (12) and is in fluid communication with a bourdon tube (44) within the differential pressure gauge (14). Low pressure fluid inlet (34) is connected to a low pressure line (36) extending to a low pressure fluid source. High pressure fluid inlet (38) is connected to a high pressure fluid line (40) extending to a high pressure fluid source for measurement of the differential fluid pressure between a low pressure source and a high pressure source.

2 Claims, 2 Drawing Sheets

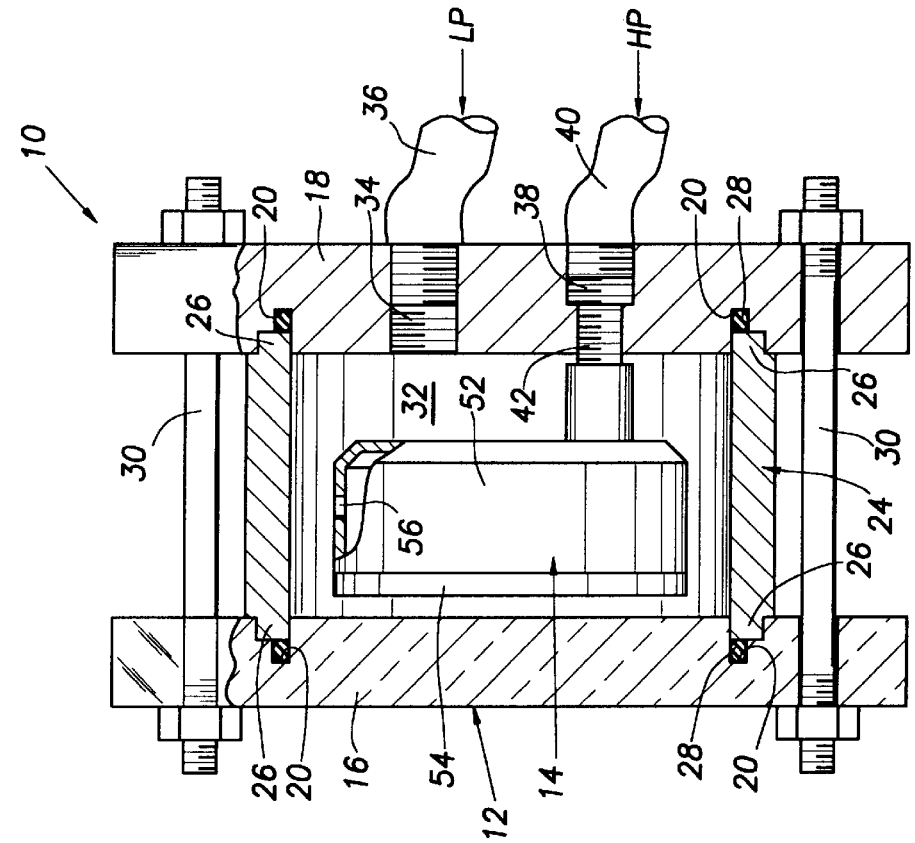
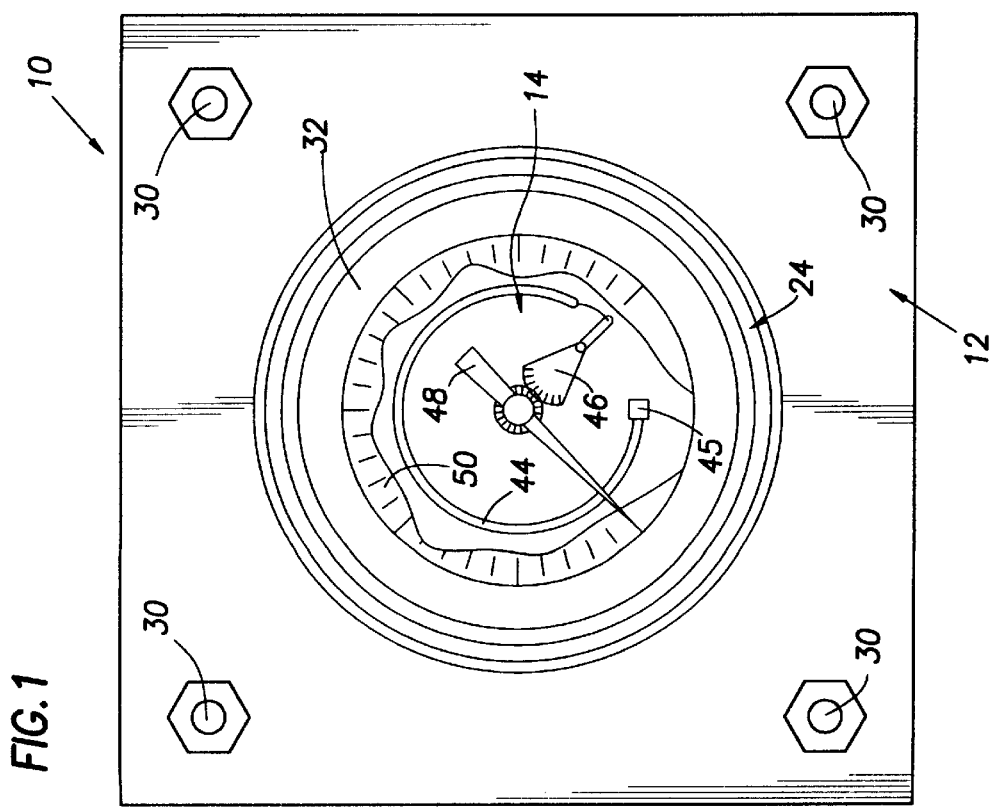

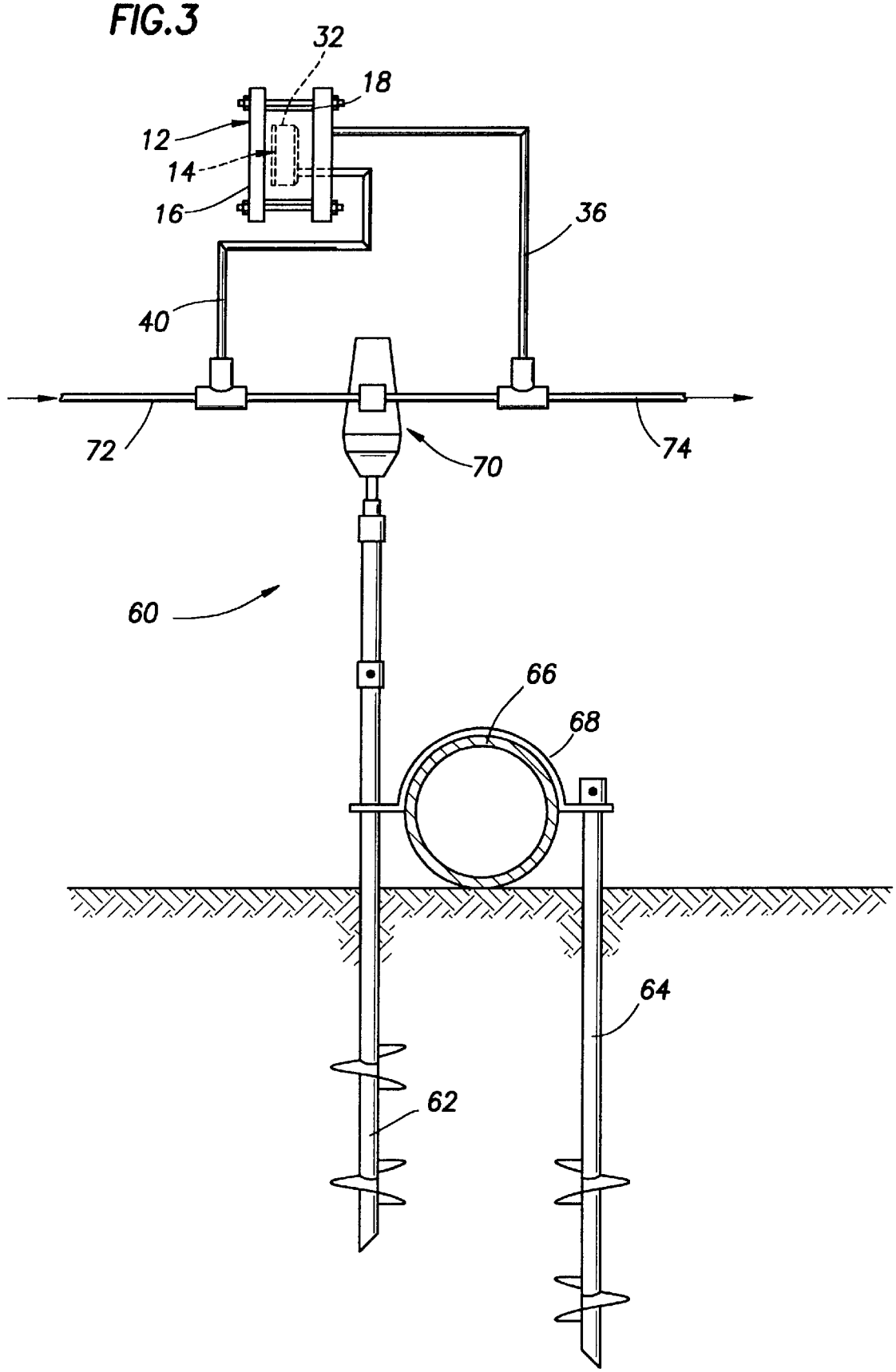

DIFFERENTIAL PRESSURE GAUGE ASSEMBLY

FIELD OF THE INVENTION

This invention relates to a differential pressure gauge assembly and more particularly to a differential pressure gauge enclosed within an outer fluid tight housing and including a bourdon tube for measuring the fluid pressure differential between two non-atmospheric pressures.

BACKGROUND OF THE INVENTION

Heretofore, such as shown in U.S. Pat. No. 3,762,224 dated Oct. 2, 1973, a differential pressure gauge has been provided utilizing a bourdon tube for measuring the differential pressure between atmospheric pressure and another fluid pressure. An outer container in the '224 patent has an outer transparent bowl which receives a conventional differential pressure gauge having an outer casing in the '224 patent. The interior of the outer container is continuously exposed to the atmosphere and the outer casing of the differential pressure gauge is not sealed so that the outer side of the bourdon tube is continuously exposed to ambient pressure of the atmosphere at all times. Any change in atmospheric pressure is relatively small and normally occurs over a relatively long time period. The outer casing for the differential pressure gauge in the '224 patent is primarily to protect the differential pressure gauge from contamination and to provide an outer enclosure that can be easily disassembled for cleaning and servicing the pressure gauge without removing the pressure gauge from the line or shutting down the line.

SUMMARY OF THE INVENTION

The present invention is directed particularly to a differential pressure gauge including a bourdon tube for measuring the fluid pressure differential between two non-atmospheric pressures. An outer fluid-tight housing defines an enclosed fluid-tight space in which an inner gauge housing having a bourdon tube therein is mounted. A high fluid pressure inlet extends through the outer housing and the inner gauge housing to the interior of the bourdon tube for fluid communication of the high fluid pressure to the interior of the bourdon tube. A low pressure inlet extends through the outer housing only and provides low fluid pressure to the space within the outer housing and outside the inner gauge housing. The inner gauge housing or casing has a vent opening extending therethrough to provide or communicate the low pressure fluid to the space within the inner housing exteriorly of the bourdon tube. Thus, high pressure fluid is communicated interiorly of the bourdon tube and low pressure fluid is communicated exteriorly of the bourdon tube for measuring the fluid pressure differential.

Other features and advantages of the present invention will be apparent from the following specification and drawings.

BRIEF DESCRIPTION OF THE DRAWINGS

FIG. 1 is a front elevation of the differential pressure gauge assembly of the present invention showing an outer fluid-tight housing enclosing a differential pressure gauge with the pressure gauge having a housing containing a bourdon tube therein;

FIG. 2 is a sectional view of the differential pressure gauge assembly shown in FIG. 1; and FIG. 3 is a schematic view of differential pressure gauge assembly of the present invention utilized for measuring the differential fluid pressure across a hydraulic fluid motor for installing earth screw anchors.

DESCRIPTION OF THE INVENTION

The pressure differential gauge assembly comprising the present invention is generally indicated at 10 having an outer housing generally indicated at 12 enclosing an inner differential pressure gauge generally indicated at 14. Outer housing 12 is easily assembled about differential pressure gauge 14. Outer housing 12 has a front rectangular wall 16 and a rear rectangular wall 18. Each wall 16, 18 has an annular groove 20 about an inner surface thereof. A cylindrical metal tube 24 has an annular rim 26 on each end thereof received within opposed grooves 20. A suitable elastomeric seal 28 is positioned within each groove 20 to provide a fluid-tight seal between metal tube 24 and walls 16, 18. Front wall 16 is preferably formed of a transparent material such as a thermoplastic synthetic resin and rear wall 18 is formed of a suitable metallic material. Nut and bolt combinations 30 draw walls 16 and 18 tightly against cylindrical metal tube 24 for assembly of outer housing 12 about differential pressure gauge 14. Metal tube 24 and walls 16, 18 define a fluid-tight inner space or volume at 32. Rear rectangular wall 18 has a low pressure fluid inlet 34 connected to a line 36 extending to a low pressure source to be measured and provides fluid communication of the low pressure fluid to inner space 32 of metal tube 24. A high pressure fluid inlet 38 in rectangular wall 18 is connected to a high pressure line 40 extending to a high pressure source. The fluid pressure differential between the non-atmospheric fluids in fluid pressure lines 36 and 40 is desired to be measured. The non-atmospheric fluids may be gaseous fluids or liquid fluids.

Differential pressure gauge 14 is positioned within space 32 enclosed by outer housing 12 and has an extending nipple 42 threaded within high pressure inlet 38 for mounting of gauge 14 onto back wall 18. Gauge 14 receives high pressure fluid from line 40 and has a bourdon tube 44 which comprises a hollow curved tube to receive high pressure fluid at inlet 45. As the inside of bourdon tube 44 is pressurized, it tends to straighten and/or move. The movement of the bourdon tube results in actuation of a gear 46 which rotates pointer 48 about a dial face 50 to indicate the differential pressure between the high pressure fluid within bourdon tube 44 and the low pressure fluid within space 32 outside bourdon tube 44. Gauge 14 has an outer housing 52 and a transparent cover or lens 54 over dial face 50. A vent opening 56 extends through housing 52 to provide fluid communication between space 32 and the outer space about bourdon tube 44 so that the low pressure fluid in space 32 is quickly communicated to bourdon tube 44.

FIG. 3 is a schematic view of the pressure differential gauge assembly 10 of the present invention utilized for measuring the differential fluid pressure across a hydraulic motor being used to install earth screw anchors such as set forth in U.S. Pat. No. 5,433,119 dated Jul. 18, 1995, the entire disclosure of which is incorporated herein for all purposes. A pipeline screw anchor assembly shown generally at 60 includes a pair of screw anchors 62 and 64 which are driven on opposite sides of a pipeline 66 to secure bracket 68 over pipeline 66. As shown, anchor 64 has been fully screwed down while anchor 62 is being screwed down.

A hydraulic fluid motor 70 is connected to anchor 62 for screwing anchor 62 downwardly and has a hydraulic fluid inlet supply line 72 and a hydraulic fluid return line 74 connected thereto. Fluid supply line 72 is connected to a high pressure hydraulic fluid source. The level of torque that is required to screw an anchor into the ground should be carefully monitored. The torque level is indicative of the strength of the soil and is a prediction of the holding capacity of an anchor. Thus, it is desired to measure the hydraulic fluid pressure differential between fluid inlet supply line 72 and fluid return line 74 for motor 70. For this purpose a pressure differential gauge assembly 10 having outer housing 12 is mounted across fluid inlet and return lines 72 and 74 as shown in FIG. 3. Low pressure hydraulic fluid in branch line 36 from return line 74 fills the space 32 about differential pressure gauge 14. High pressure hydraulic fluid in branch line 40 from high pressure supply line 40 enters bourdon tube 44. Outer housing 12 includes opposed walls 16 and 18. Thus, gauge 14 is effective to measure the hydraulic fluid pressure differential across hydraulic fluid motor 70 for determining the torque level of screw anchor 62.

From the above, it is apparent that a conventional differential pressure gauge may be utilized for measuring the differential fluid pressure between two non-atmospheric fluids by enclosing the fluid pressure gauge within an outer fluid-tight housing. The housing is easily assembled about the differential fluid pressure gauge. The differential pressure gauge fits within the space formed by a cylindrical tube and end walls are easily assembled adjacent the opposed ends of the metal tube.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. A hydraulic fluid system for screwing the shaft of an anchor down into the ground comprising:

a hydraulic fluid motor connected to the shaft for rotating the anchor;

a high pressure hydraulic fluid main supply line to said motor;

a low pressure hydraulic fluid main return line from said motor; and a differential pressure gauge assembly for measuring the hydraulic fluid pressure differential between said high pressure supply line and said low pressure return line; said differential gauge assembly including:

an inner differential pressure gauge having an outer gauge housing enclosing a bourdon tube;

an outer fluid-tight housing releasably assembled about and enclosing said inner differential pressure gauge;

a high pressure hydraulic fluid branch line from said main supply line extending through said outer fluid-tight housing and said outer gauge housing in fluid communication with the interior of said bourdon tube to provide high pressure hydraulic fluid to the interior of said bourdon tube; and a low pressure hydraulic fluid branch line from said main return line extending through said outer fluid-tight housing and communicating with the space about said differential pressure gauge and in fluid communication with the outside of said bourdon tube; whereby said differential pressure gauge is effective for measuring the fluid pressure differential between said low pressure main return line and said high pressure main supply line;

said outer fluid-tight housing including an open ended cylindrical body and a pair of opposed end members connected to opposite ends of said open ended cylindrical body in a fluid-tight relation, one of said end members having said low pressure fluid inlet and said high pressure fluid inlet therein the other end member being transparent for visual observation of said pressure gauge.

2. The hydraulic fluid system as setforth in claim 1 wherein fastening members connected between said end members draw said opposed end members tightly against said cylindrical body.

* * * * *